United States Patent
Hollinger et al.

(10) Patent No.: US 6,546,146 B1
(45) Date of Patent: Apr. 8, 2003

(54) SYSTEM FOR INTERACTIVE VISUALIZATION AND ANALYSIS OF IMAGING SPECTROMETRY DATASETS OVER A WIDE-AREA NETWORK

(75) Inventors: Allan B. Hollinger, Toronto (CA); Shen-en Qian, Montréal (CA); Daniel J. Williams, Vancouver (CA)

(73) Assignee: Canadian Space Agency, Saint-Hubert (CA)

(*) Notice: Subject to any disclaimer, the term of this patent is extended or adjusted under 35 U.S.C. 154(b) by 0 days.

(21) Appl. No.: 09/182,187

(22) Filed: Oct. 30, 1998

Related U.S. Application Data

(60) Provisional application No. 60/063,796, filed on Oct. 31, 1997.

(30) Foreign Application Priority Data

Oct. 31, 1997 (CA) .............................................. 2219809

(51) Int. Cl.[7] .............................. G06K 9/36; G06K 9/38; G06K 9/46; H04B 1/66
(52) U.S. Cl. ....................... 382/253; 382/232; 382/233; 382/240; 382/251; 382/248; 375/240.03; 375/240.22
(58) Field of Search ................................. 382/232–253, 382/165, 209, 224, 191, 217–218; 704/222

(56) References Cited

U.S. PATENT DOCUMENTS

| | | | | |
|---|---|---|---|---|
| 5,468,069 A | * | 11/1995 | Prasanna et al. ............ | 382/253 |
| 5,526,464 A | * | 6/1996 | Mermelstein ................ | 395/228 |
| 5,799,110 A | * | 8/1998 | Israelsen et al. ............ | 382/253 |
| 5,805,739 A | * | 9/1998 | Malvar et al. ............... | 382/253 |
| 5,890,110 A | * | 3/1999 | Gersho et al. ............... | 704/222 |
| 6,018,587 A | * | 1/2000 | Cabib ......................... | 382/165 |

OTHER PUBLICATIONS

Ryan, Michael J. and Arnold, John F., "Lossy Compression of Hyperspectral Data Using Vector Quantization," *Remote Sens. Environ.*, Elsevier Science Inc., New York, N.Y., 1997, vol. 61, pp. 419–436.

* cited by examiner

*Primary Examiner*—Phuoc Tran
*Assistant Examiner*—Amir Alavi
(74) *Attorney, Agent, or Firm*—Freedman & Associates

(57) ABSTRACT

The present invention relates to a method of viewing and processing hyper-spectral image data compressed using a VQ algorithm. According to the invention the data is compressed using a codebook of codevectors including binary spectral vectors, which allows processing of the compressed data and viewing of data within a datacube without expanding the compressed data into the complete datacube. In order to view an image derived from a datacube, for each pixel within the image a location within the datacube is selected, an index value from the index map at that location is retrieved, and a spectral value from a spectral vector within the codebook is retrieved for said pixel, the spectral vector identified by the retrieved index. A single spectral vector is easily viewed by displaying a spectral vector from the codebook.

44 Claims, 5 Drawing Sheets

SYSTEM FOR INTERACTIVE VISUALIZATION AND ANALYSIS OF IMAGING SPECTROMETRY DATASETS OVER A WIDE-AREA NETWORK

The present application claims priority from U.S. provisional application No. 60/063,796 entitled "System for Interactive Visualization and Analysis of Imaging Spectrometry Datasets Over a Wide-Area Network," filed on Oct. 31, 1997, and from Canadian application number 2,219,809, entitled "System for Interactive Visualization and Analysis of Imaging Spectrometry Datasets Over a Wide-Area Network," filed on Oct. 31, 1997.

FIELD OF THE INVENTION

This invention relates to a lossy data compression system using vector quantisation, for reducing data volumes generated by hyper-spectral imaging devices.

BACKGROUND OF THE INVENTION

The next generation of satellite-based remote sensing instruments will produce an unprecedented volume of data. Imaging spectrometers, also known as hyper-spectral imaging devices, are prime examples. They collect image data in hundreds of spectral bands simultaneously from the near ultraviolet through the short wave infrared, and are capable of providing direct identification of surface materials.

Hyper-spectral data thus collected are typically in the form of three-dimensional (3D) data cube. Each data cube has two dimensions in the spatial domain defining a rectangular plane of image pixels, and a third dimension in the spectral domain defining radiance levels of multiple spectral bands per each image pixel. The volume and complexity of hyper-spectral data present a significant challenge to conventional transmission and image analysis methods. The raw data rates for transmitting such data cubes can easily exceed the available downlink capacity or on-board storage capacity of existing satellite systems. Often, therefore, a portion of the data collected on board is discarded before transmission, by reducing the duty cycle, reducing the spatial or spectral resolution, and/or reducing the spatial or spectral range. Obviously, in such cases large amounts of information are lost.

For data processing, a similar problem occurs. In computing, a current trend is toward desktop computers and Internet based communications. Unfortunately, the data cubes require a tremendous amount of storage and, for processing, the storage is preferably random access memory (RAM). Current desktop computers often lack sufficient resources for data processing of data cubes comprising spectral data.

Recent work related to data compression of multi-spectral and hyper-spectral imagery has been reported in the literature, but most of these studies relate to multi-spectral imagery comprised of only a few spectral bands. These prior art systems for multi-spectral imagery yield small compression ratios, usually smaller than 30:1. There are two reasons for this:

1) the prior art systems do not efficiently remove the correlation in the spectral domain, and
2) the redundancy of multi-spectral imagery in the spectral domain is relatively small compared to that of hyper-spectral imagery.

Gen et al teach two systems for hyper-spectral imagery. The first system uses trellis coded quantisation to encode transform coefficients resulting from the application of an 8×8×8 discrete cosine transform. The second system uses differential pulse code modulation to spectrally decorrelate data, while using a 2D discrete cosine transform for spatial decorrelation. These two systems are known to achieve compression ratios of greater than 70:1 in some instance; however, it is desirable to have higher compression ratios with simpler coding structures than those reported in the literature.

In an article entitled "Lossy Compression of Hyperspectral Data Using Vector Quantization" by Michael Ryan and John Arnold in the journal *Remote Sens. Environ.*, Elsevier Science Inc., New York, N.Y., 1997, Vol. 61, pp. 419–436, an overview of general vector quantization techniques as are now known is presented. The article is herein incorporated by reference. In particular, the authors describe issues such as distortion measures and classification issues arising from lossy compression of hyper-spectral data using vector quantization.

Data compression using Vector Quantisation (VQ) has received much attention because of its promise of high compression ratio and relatively simple structure. Unlike scalar quantisation, VQ requires segmentation of the source data into vectors. Commonly, in two-dimensional (2D) image data compression, a block with n×m (n may be equal to m) pixels is taken as a vector, whose length is equal to n×m. Vectors constituted in this way have no physical analogue. Because the blocks are segmented according to row and column indices of an image, the vectors obtained in this manner change at random as the pixel patterns change from block to block. The reconstructed image shows an explicit blocking effect for large compression ratios.

There are several conventional approaches to constituting vectors in a 3D data cube of hyper-spectral imagery. The simplest approach is to treat the 3D data cube as a set of 2D monochromatic images, and segment each monochromatic image into vectors independently as in the 2D-image case. This approach, however, suffers from not taking advantage of the high correlation of data in the spectral domain. There is therefore a need for a data compression system that takes advantage of correlation in the spectral domain and the 2D spatial correlation between adjacent image pixels.

The VQ procedure is known to have two main steps: codebook generation and codevector matching. VQ can be viewed as mapping a large set of vectors into a small subset of indexed codevectors forming a codebook. During encoding, a search through a codebook is performed to find a best codevector to express each input vector. The index or address of the selected codevector in the codebook is stored associated with the input vector or the input vector location. Given two systems having a same codebook, transmission of the index to a decoder over a communication channel from the first system to the second other system allows a decoder within the second other system to retrieve the same codevector from an identical codebook. This is a reconstructed approximation of the corresponding input vector. Compression is thus obtained by transmitting the index of the codevector rather the codevector itself. Many existing algorithms for codebook designs are available, such as the LBG algorithm reported by Linde, Buzo and Gray, the tree-structure codebook algorithm reported by Gray, the self organising feature map reported by Nasrabadi and Feng. Among these, the LBG algorithm is most widely used because of its fidelity. The disadvantages of the LGB algorithm are its complexity and the time burden taken to form the codebook. When the input data is a 3D data cube of hyper-spectral imagery, the processing time can be hundreds of times higher than the normal 2D-image case. There is therefore a need for faster codebook generation algorithms with relatively high fidelity.

It would also be advantageous to provide a method of data compression wherein data compressed according to the method is useful for some forms of data processing, image generation, and data viewing.

SUMMARY OF THE INVENTION

It is an object of the present invention to provide a data compression system that allows viewing and analysis of large datastructures without decompression of the entire datastructure. It is yet another object of the invention to provide a data compression algorithm that would allow relatively fast processing of 3D data cubes in a compressed form.

In accordance with the invention there is provided a method of processing hyper-spectral image data defining signal levels of multiple spectral bands in encoded form, the encoded form comprising an array of indices and a codebook comprising a plurality of vectors, the method comprising the steps of:

for each image pixel,
determining a first band from the multiple spectral bands and an index from the array of indices, the index indicative of a vector within the codebook, and
retrieving from the indicated vector within the codebook a value corresponding to the first band; and,
displaying an image comprising image pixels, image pixel values based upon the values retrieved for each image pixel.

In accordance with the invention there is also provided a method of processing hyper-spectral image data defining signal levels of multiple spectral bands per image pixel in encoded form, the encoded form comprising an array of indices and a codebook, the method comprising the step of:

processing spectral vectors within the codebook to produce a processed codebook, each spectral vector processed in isolation.

According to an embodiment the method comprises the further steps of:

transmitting the codebook and the array of indices from a first computer to a second other computer, the second other computer remote from the first computer,
wherein the step of processing is performed on the second other computer and includes determining from the codebook and the array of indices, data within the hyper-spectral data that is significant for further analysis;
requesting the data from the first computer;
compressing uncompressed hyper-spectral data associated with the requested data according to a known compression algorithm to produce compressed data; and,
transmitting the compressed data to the second computer.

In accordance with the invention there is also provided a method of processing hyper-spectral image data defining signal levels of multiple spectral bands per image pixel in encoded form, the encoded form comprising an array of indices and a codebook, the method comprising the step of:

processing spectral vectors within the codebook and data from the index map to extract information from the codebook and index map other than pixel values for display.

In accordance with another aspect of the invention there is provided a system for processing hyper-spectral image data defining signal levels of multiple spectral bands in encoded form, the encoded form comprising an array of indices and a codebook comprising a plurality of vectors, the system comprising:

means for selecting for each image pixel a first band from the multiple spectral bands and an index from the array of indices, the index indicative of a vector within the codebook, and
means for retrieving for each image pixel from the indicated vector within the codebook a value corresponding to the first band; and,
means for displaying an image comprising image pixels, image pixel values based upon the values retrieved for each image pixel.

In accordance with the other aspect of the invention there is also provided a system for processing hyper-spectral image data defining signal levels of multiple spectral bands per image pixel in encoded form, the encoded form comprising an array of indices and a codebook, the system comprising:

means for processing each spectral vector within the codebook in isolation to produce a processed codebook.

In accordance with yet another aspect of the present invention there is provided a system for processing in a compressed form, hyper-spectral image data defining radiance levels of multiple spectral bands per image pixel, said system being initially trained with image data defining a predetermined set of training image pixels, said system comprising:

a) vector constitution means having an input for receiving and representing the image data as an array of spectrum image vectors $\vec{x}_p$, said array having a predetermined dimension n, each said vector to characterise the spectral bands of an image pixel p, said vector having a predetermined dimension of $N_b$ components $x_p(\lambda)$, $\lambda$ having any value between 1 and $N_b$;

b) spectral compressor responsive to the vector constitution means, including a compression algorithm for reducing any of said spectrum image vectors to a binary image vector $\vec{X}_p$ having a predetermined length L;

c) a codevector generator responsive to the spectral compression means, for receiving a predetermined set of training binary image vectors corresponding to the predetermined set of training image pixels, said generator having a codevector algorithm for deriving from said set of training binary image vectors a finite set of binary codevectors $\vec{Y}_q$ and having means for storing said set of codevectors;

d) vector matching means responsive to the spectral compressor for receiving the binary image vectors and responsive to the codevector generator for reading the binary codevectors, said matching means including a distance algorithm for calculating the distance $D_{pq}$ of any received binary imagevector $\vec{X}_p$ to each element $\vec{Y}_q$ in the finite set of binary codevectors, and for selecting a matched binary codevector having shortest distance from said received binary image vector, as a compressed form of the spectrum image vector $\vec{x}_p$, said matching means having an output for providing an array of said matched binary codevectors as a compressed form of the hyper-spectral image data suitable for further image processing;

In an embodiment of the present invention, the compression algorithm used in spectral compression, upon receiving a spectral image vector $\vec{x}_p$ performs the steps of:

a) calculating a spectral algebraic mean $\mu_p$ of the $N_b$ components $x_p(\lambda)$ of the received spectrum image vector $\vec{x}_p$;

b) generating an amplitude binary vector $\vec{X}_p^a$ having a length of $N_b$ bits $X_p^a(\lambda)$, $\lambda$ having any value between 1 and $N_b$, where $X_p^a(\lambda)$ equals a first binary level when $x_p(\lambda)$ is greater than or equal to $\mu_p$, and $X_p^a(\lambda)$ equals a second binary level when $x_p(\lambda)$ is smaller than $\mu_p$;

c) generating a slope binary vector $\vec{X}_p^s$ having a length of $N_b-2$ bits $X_p^s(\lambda)$, $\lambda$ having a value between 2 and $N_b-1$, where $X_p^s(\lambda)$ equals a first binary level when $x_p(\lambda+1)$ is greater than or equal to $x_p(\lambda-1)$, and $X_p^s(\lambda)$ equals a second binary level when $x_p(\lambda+1)$ is smaller than $x_p(\lambda-1)$;

d) calculating a spectral mean deviation $MD_i$ as the mean of the absolute difference between each of the $N_b$ components $x_p(\lambda)$ of the spectrum image vectors $\vec{x}_p$ and the spectral algebraic mean $\mu_p$;

e) generating a mean deviation binary vector $\vec{X}_p^{MD}$ having a length of $N_b$ bits $X_p^{MD}(\lambda)$, $\lambda$ having any value between 1 and $N_b$, where $X_p^{MD}(\lambda)$ equals a first binary level when the absolute difference between $x_p(\lambda)$ and $\mu_p$ is greater than or equal to $MD_p$, and $X_p^{MD}(\lambda)$ equals a second binary level when the absolute difference between $x_p(\lambda)$ and $\mu_p$ is smaller than $MD_p$; and f) reducing the received spectrum image vectors to a binary image vector $\vec{X}_p$ having a length $L=3N_b-2$ bits, in the form of a concatenation of the amplitude binary vector $\vec{X}_p^a$, the slope binary vector $\vec{X}_p^s$ and the mean deviation binary vector $\vec{X}_p^{MD}$.

In another embodiment of the present invention, the distance algorithm for determining a distance such as a Hamming distance, $D_{pq}$, is capable of calculating the distance between a binary vector $\vec{X}_p$ and a binary codevector $\vec{Y}_q$ as the arithmetic sum of bit-wise exclusive-OR operations on all bit pairs $(X_p(l), Y_q(l))$ corresponding to $\vec{X}_p$ and $\vec{Y}_q$, l having any value between 1 and L; alternatively, a Euclidean distance is calculated between the image vectors $\vec{x}_p$ and codevectors $\vec{y}_q$.

In accordance with the present invention there is also provided a system for compressing hyper-spectral image data defining radiance levels of multiple spectral bands per each pixel of a two-dimensional image having $N_r$ rows and $N_c$ columns of pixels, said system comprising:

a) vector constitution means for receiving and representing the image data as a two-dimensional vector array of $N_r \times N_c$ spectrum image vectors $\vec{x}_p$, p having any value from 1 to $N_r \times N_c$ each said vector being positioned at a row co-ordinate i and a column co-ordinate j of said vector array, to characterise the spectral bands of an image pixel at similar i and j co-ordinates within the two-dimensional image, i having any value from 1 to $N_r$ and j having any value from 1 to $N_c$, said vector having a predetermined dimension of $N_b$ components $x_p(\lambda)$, $\lambda$ having any value between 1 and $N_b$;

b) spectral compressor responsive to the vector constitution means for reducing any of said spectrum image vectors to a binary image vector $\vec{X}_p$;

c) a codevector generator responsive to the spectral compressor for receiving a predetermined set of training binary image vectors, deriving therefrom a finite set of binary codevectors $\vec{Y}_q$, each codevector identifiable with an index;

d) a codebook responsive to the codevector generator for storing, in the form of a look-up table, said set of binary codevectors and the set of indices in a one-to-one mapping relationship between each binary codevector and its corresponding index;

e) vector matching means responsive to the spectral compressor and the codebook, for receiving the binary image vectors, said matching means including a distance algorithm for calculating the distance $D_{pq}$ of any received binary image vector $\vec{X}_p$ to each element $\vec{Y}_q$ in the set of binary codevectors in the codebook, and for selecting a matched binary codevector having shortest distance from said received binary image vector;

f) a correlation encoder responsive to the vector matching means and the codebook for receiving said matched binary codevectors, said encoder comprising
  i) means for retrieving from the codebook an index corresponding to each matched binary codevector received therein,
  ii) means for forming a two-dimensional index array of $N_r \times N_c$ indices $C_p$, each said index being positioned at a row co-ordinate i and a column co-ordinate j of said index array, to correspond to an image pixel at similar i and j co-ordinates within the two-dimensional image,
  iii) a movable two-dimensional window having $W_r$ rows and $W_c$ columns, $W_r$ and $W_c$ having predetermined values of less than or equal to $N_r$ and $N_c$ respectively, said window being capable of reading the indices in adjacent index positions within any cell of $W_r \times W_c$ indices from the index array,
  iv) a correlation algorithm for moving the window in a predetermined sequence across the entire index array, having the window read the indices of one cell at a time, and generating a correlation symbol for each cell read by the window, each said symbol to refer to no more than once to an index value read within said cell, and to define a dissimilarity pattern among index values within said cell.

This embodiment is intended to reduce the correlation in both spatial and spectral domain with the additional benefit of reduced computation complexity.

In accordance yet with another aspect of the present invention there is provided a system for compressing, and communicating in a compressed form, hyper-spectral image data defining radiance levels of multiple spectral bands per image pixel, said system being initially trained with image data defining a predetermined set of training image pixels, said system comprising:

a) vector constitution means for receiving and representing the image data as an array of spectrum image vectors $\vec{x}_p$, said array having a dimension n, each said vector to characterise the spectral bands of an image pixel p, said vector having a predetermined dimension of $N_b$ components $x_p(\lambda)$, $\lambda$ having any value between 1 and $N_b$;

b) spectral compressor responsive to the vector constitution means, including a compression algorithm for reducing any of said spectrum image vectors to a binary image vector $\vec{X}_p$;

c) a codevector generator responsive to the spectral compressor and the vector constitution means, for receiving a predetermined set of training spectrum image vectors and a corresponding set of binary image vectors thereto, said generator having a codevector algorithm for deriving from said set of spectrum image vectors a finite set of spectrum codevectors $\vec{y}_q$, and for deriving from the corresponding binary image vectors a finite set of binary codevectors $\vec{Y}_q$, and generating a set of indices $C_q$ corresponding to said spectrum codevectors;

d) a codebook responsive to the codevector generator for storing, in the form of a look-up table, said finite set of spectrum codevectors $\vec{y}_q$, together with said finite set of binary codevectors $\vec{Y}_q$ in a one-to-one mapping relationship to said corresponding indices $C_q$;

e) vector matching means responsive to the spectral compressor for receiving the binary image vectors, and responsive to the codebook for reading the set of binary codevectors, said matching means including a distance algorithm for calculating the distance $D_{pq}$ of any received binary image vector $\vec{X}_p$ to each read codevector $\vec{Y}_q$, and for selecting a matched binary codevector having shortest distance from said received binary image vector;

f) an encoder responsive to the vector matching means and the codebook for receiving said matched binary codevectors, said encoder comprising means for retrieving from the codebook an index to correspond to each matched binary codevector received by the encoder, and for forming an array of indices to render a compressed form of the hyper-spectral image data, suitable for delivery to a communications or storage medium;

g) a decoder responsive to the communications medium for receiving said indices, referring to the codebook to map each received index into a corresponding spectrum codevector, and forming an array of reconstructed spectrum codevectors suitable for image display or further image processing.

Unlike conventional compression and coding schemes, the vectors constituted by the present invention have a physical meaning: each vector is a spectral vector representative of a spectrum, and each spectrum is an indicator of the material in a surface such as the earth's surface that lies within the field of view. Since the number of materials in an imaged scene is usually limited, the number of different encoded spectra can be much smaller than the total number of vectors $N_r \times N_c$. By taking advantage of this redundancy, the present invention expresses all the spectral vectors using a codebook with comparatively few binary codevectors and achieves good reconstruction fidelity. This way, the invention makes better use of the high correlation often found between bands in the spectral domain and can achieve a relatively high compression ratio. Furthermore, encoding the image vectors in a binary form permits faster codebook generation and faster codevector matching. In view of the physical meaning attached to each encoded binary vector, it would be possible to apply image-processing operations to the compressed form of the much shorter and fewer binary vectors than the hyper-spectral image data in its raw uncompressed form.

BRIEF DESCRIPTION OF THE DRAWINGS

Exemplary embodiments of the invention will now be described in conjunction with the drawings in which:

FIG. 5 is an example of a filtering operation; and

FIG. 6 is a resulting codebook of the example of the filtering operation shown in FIG. 5.

DETAILED DESCRIPTION OF THE INVENTION

Figure 1:
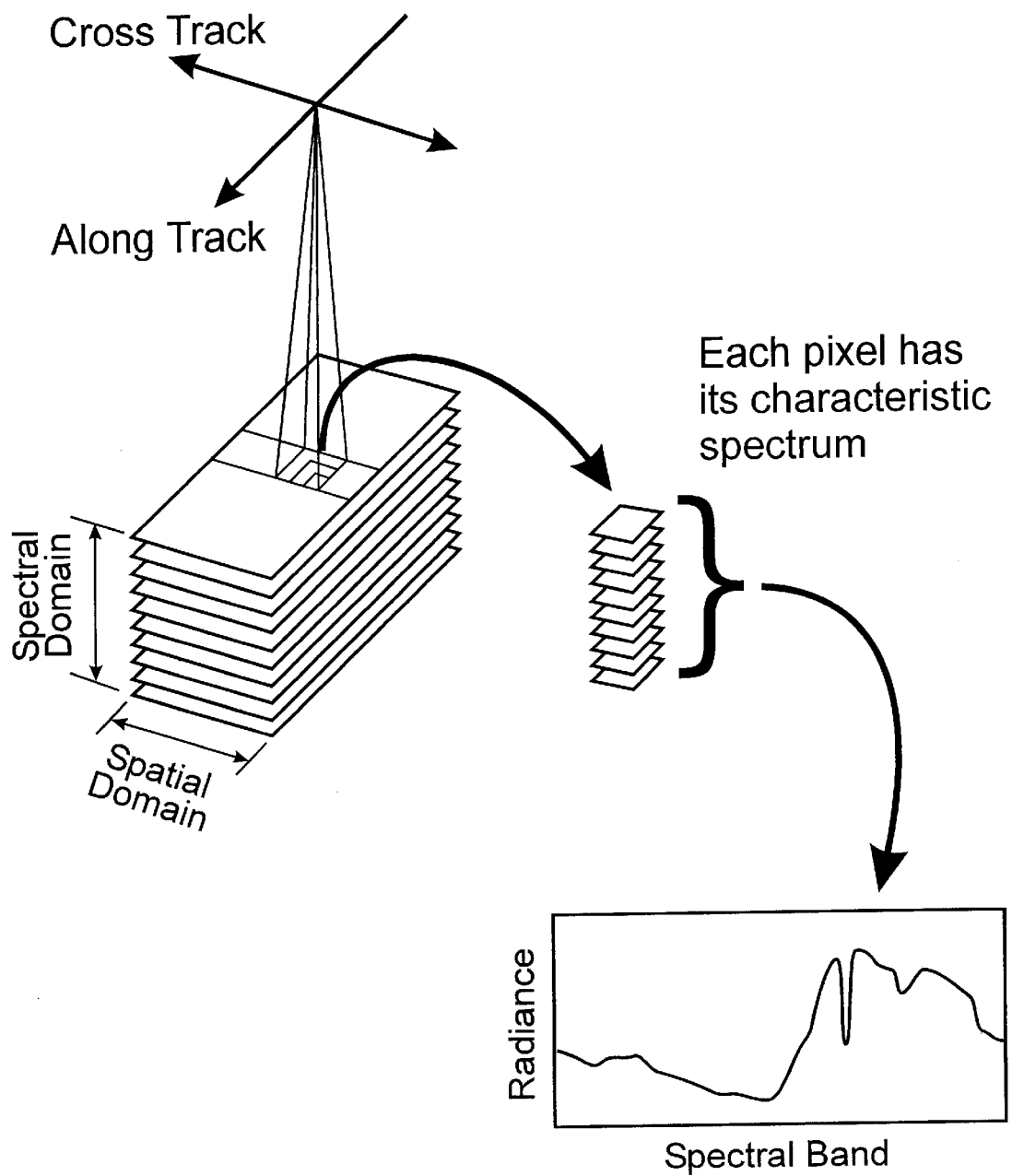
FIG. 1 is a perspective view of a hyper-spectral data cube having two dimensions in the spatial domain defining a rectangular plane of image pixels, and a third dimension in the spectral domain defining radiance levels of multiple spectral bands per each image pixel.
Figure 2:
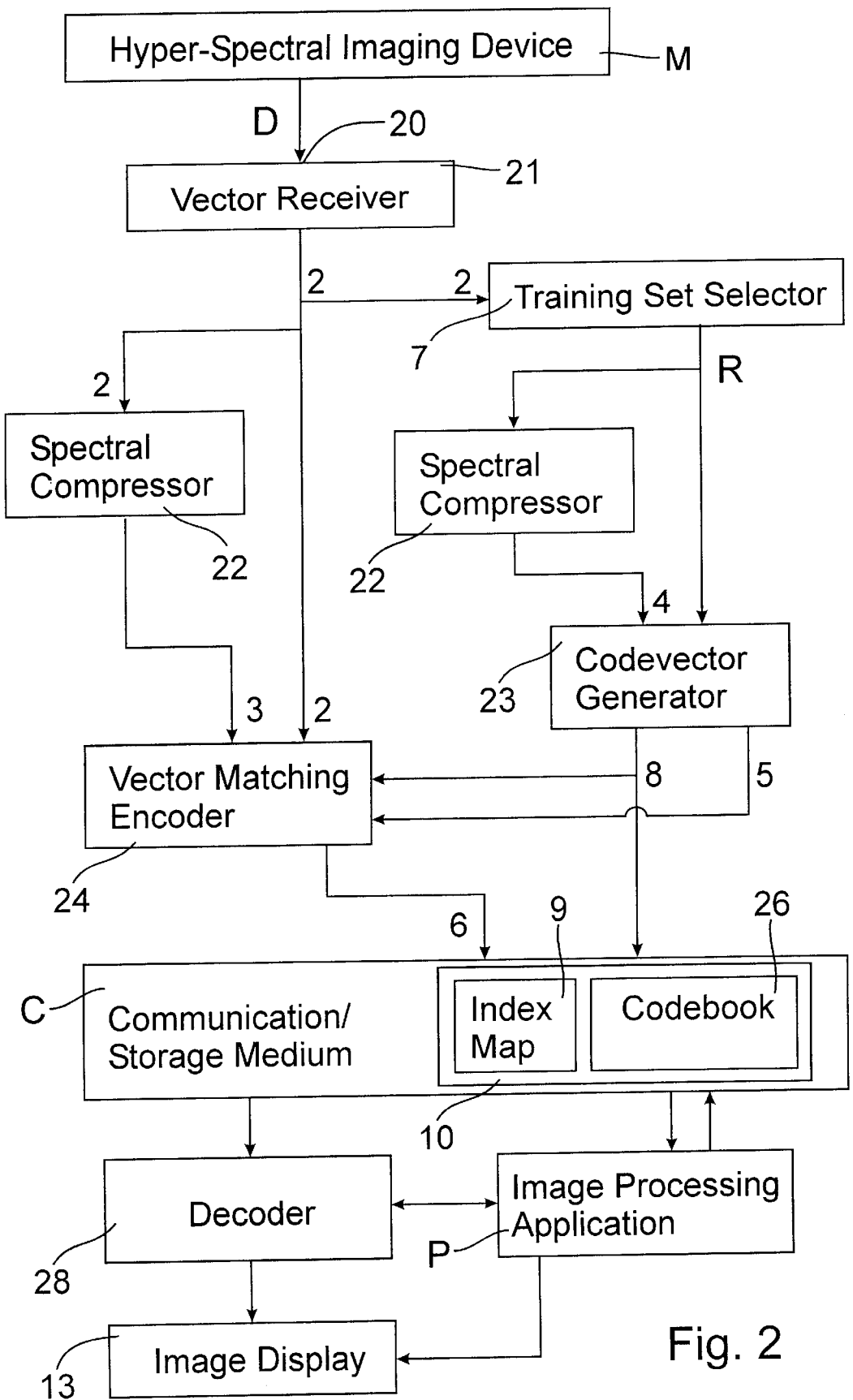
FIG. 2 is a block diagram of a preferred embodiment of a system for compressing, communicating and processing in a compressed form, hyper-spectral image data defining radiance levels of multiple spectral bands per image pixel, said system being initially trained with image data defining a predetermined set of training image pixels.

FIG. 2 illustrates in a block diagram, a system 100 for compressing hyper-spectral image data D received from a hyper-spectral imaging device M, in accordance with an embodiment of the present invention. In general, hyper-spectral data define radiance levels of multiple spectral bands per each image pixel. Thus for a planar imaging area, hyper-spectral data includes a planar image at each of a plurality of bands. When these images are stacked into a three-dimensional array or structure, they form a datacube D. Depending on the characteristics of the imaging device M, the image data D produced thereby defines an image of one, two, three or more dimensions. An example of a two-dimensional image derived from hyper-spectral data D is illustrated in FIG. 1.

Referring to FIG. 2, vector constitution means, in the form of a vector receiver 21, receives at an input port 20 thereof the image data D, and represents the data D into an array of spectrum image vectors 2, herein referred to as $\vec{x}_p$. The spectrum image vectors 2 have a same dimension n as that of the image data D, where n=1, 2, 3 or more. The spectrum image vectors 2 are each associated with an image pixel p within the image data D. Each image vector has a predetermined dimension of $N_b$ components $x_p(\lambda)$, $\lambda$ having any value between 1 and $N_b$, where each component characterises one particular spectral band of an image pixel p.

The array of spectrum image vectors 2 is then transferred to a spectral compressor 22, which executes a compression algorithm for reducing any of said spectrum image vectors 2 to a binary image vector 3, hereby referred to as $\vec{X}_p$, which has a predetermined length L. The spectral compressor 22 also includes a compression algorithm for use in training. For clarity, the spectral compressor 22 is shown twice, once for training and once for compression functionality, even though a single spectral compressor 22 commonly exists. The spectral compressor 22 during execution of the compression algorithm, upon receiving a spectrum image vector 2 performs the steps of:

a) calculating a spectral algebraic mean $\mu_p$ of the $N_b$ components $x_p(\lambda)$ of the received spectrum image vector $\vec{x}_p$;

b) generating an amplitude binary vector $\vec{X}_p^a$ having a length of $N_b$ bits $X_p^a(\lambda)$, $\lambda$ having any value between 1 and $N_b$, where $X_p^a(\lambda)$ equals a first binary level when $x_p(\lambda)$ is greater than or equal to $\mu_p$, and $X_p^a(\lambda)$ equals a second binary level when $x_p(\lambda)$ is smaller than $\mu_p$.

c) generating a slope binary vector $\vec{X}_p^s$ having a length of $N_b-2$ bits $X_p^s(\lambda)$, $\lambda$ having a value between 2 and $N_b-1$, where $X_p^s(\lambda)$ equals a first binary level when $x_p(\lambda+1)$ is greater than or equal to $x_p(\lambda-1)$, and $X_p^s(\lambda)$ equals a second binary level when $x_p(\lambda+1)$ is smaller than $x_p(\lambda-1)$;

d) calculating a spectral mean deviation $MD_i$ as the mean of the absolute difference between each of the $N_b$ components $x_p(\lambda)$ of the spectrum image vectors $\vec{x}_p$ and the spectral algebraic mean $\mu_p$;

e) generating a mean deviation binary vector $\vec{X}_p^{MD}$ having a length of $N_b$ bits $X_p^{MD}(\lambda)$, $\lambda$ having any value between 1 and $N_b$, where $X_p^{MD}(\lambda)$ equals a first binary level when the absolute difference between $x_p(\lambda)$ and $\mu_p$ is greater than or equal to $MD_p$, and $X_p^{MD}(\lambda)$ equals a second binary level when the absolute difference between $x_p(\lambda)$ and $\mu_p$ is smaller than $MD_p$; and f) reducing the received spectrum image vectors to a binary image vector $\vec{X}_p$ having a length $L=3N_b-2$ bits, in the form of a concatenation of the amplitude binary vector $\vec{X}_p^a$, the slope binary vector $\vec{X}_p^s$ and the mean deviation binary vector $\vec{X}_p^{MD}$.

The spectral vectors 2 are also provided to a training set selector 7. A set of training vectors R selected from the spectral vectors 2 or selected in another fashion are provided to a codevector generator 23. The codevector generator 23 requires training using the predetermined set of training vectors R provided in the form of a set of training spectral vectors R to the spectral compressor 22, which in turn provides a corresponding set of training binary vectors 4 to the codevector generator 23. The codevector generator 23 is used for generating a finite set of codevectors such as binary codevectors 5 or other codevectors 8, where training vectors derived from the image vectors 2 are mapped onto a particular other codevector 8 and/or binary codevector 5 for the purpose of vector matching. Of course the codevector generator 23 is also capable of determining a set of other codevectors 8 based on the training image vectors R. This generator 23 uses a codevector algorithm to derive from the set of training binary image vectors 4 a finite set of binary codevectors 5, hereby referred to as $\vec{Y}_q$. The codevector generator 23 includes means for deriving from the received set of training spectrum image vectors 7, a finite set of spectrum codevectors 8, hereby referred to as $\vec{y}_q$, corresponding to the set of binary codevectors 5. The codevector generator 23 also comprises memory for storing the set of other codevectors 8. Examples of storage means include volatile memory such as RAM, and non-volatile memory such as ROM, magnetic storage means such as tape or disk, and optical storage means. Of course, other memory devices may also be employed. Alternatively, when matching of binary vectors is not performed, only the codevectors 8 are necessary.

The finite set of binary codevectors 5 are then stored in a codebook 26. The codebook 26 is in the form of a look-up table, each vector corresponding to an index from a set of indices 9 in a one-to-one mapping relationship, the look-up table and a corresponding set of indices 9 are herein referred to as $C_q$.

Binary image vectors 3 generated by the spectral compressor 22 and spectrum image vectors 2 are provided to a vector matching system 24, which also receives the binary codevectors 5 and/or the other codevectors 8 provided by the codevector generator 23. The vector matching system 24 includes means for calculating the distance $D_{pq}$ between any received binary image vector $\vec{X}_p$ and each element $\vec{Y}_q$ in the finite set of binary codevectors 5 and for selecting an index associated with a matched codevector 6 having substantially short distance from the binary image vector 3. Preferably, the selected index associated with the matched codevector 6 has a shortest distance from the binary image vector 3. For example, the Hamming distance $D_{pq}$ between a binary image vector $\vec{X}_p$ and a binary codevector $\vec{Y}_q$ is calculated as an arithmetic sum of bit-wise exclusive-OR operations on all bit pairs $(X_p(l), Y_q(l))$ corresponding to $\vec{X}_p$ and $\vec{Y}_q$, l having any value between 1 and L. Preferably, a subset of vectors is identified using Hamming distance calculations and a vector from the subset is selected using a more accurate distance determination such as a determination of Euclidean distance between other codevectors and the spectral image data $\vec{x}_p$. This is achieved as follows. The vector matching system 24 comprises means for executing algorithms for reducing a number of operations required to calculate the distance $D_{pq}$ between all bit pairs $(X_p(l), Y_q(l))$, as follows:

i) means for executing a spectral means algorithm for calculating a spectral algebraic mean $\mu_i$ of the $N_b$ components $x_p(\lambda)$ of any of the spectrum image vectors $\vec{x}_p$ received from the vector receiver 21, and a spectral algebraic mean $\mu_q$ of the $N_b$ components $y_q(\lambda)$ of any of said set of spectrum codevectors $\vec{y}_q$; and ii) means for executing a search acceleration algorithm for identifying a subset $T_q$ of binary codevectors $\vec{Y}_r$ corresponding to a subset of spectrum codevector $\vec{y}_r$ having mean $\mu_r$ in the vicinity of the mean $\mu_p$ of any of the received spectrum image vectors $\vec{x}_p$, within a predetermined difference in magnitude.

A Hamming distance algorithm is used to calculate a distance $D_{pq}$ only for a smaller subset of binary codevectors $T_q$. Optionally, a second level of codevector matching is used which more accurately selects codevectors based on Euclidean distances.

An index referring to the matched codevector 6 then serves as a compressed form of the spectrum image vector $\vec{x}_p$. The matching system 24 block provides an array of indices relating to matched codevectors to serve as a compressed form of the hyper-spectral image data D, which would be suitable for further image processing applications P.

The indices 9 indicative of the matched codevectors are then provided to a communication device and/or a storage device C a in the form of an array of indices forming a matched codevector index map 9 to render a compressed data 10 for the hyper-spectral image data D, which would be suitable for delivery to a communications or storage medium C, or for further image processing applications P.

According to prior art techniques a decoder receives compressed data. The decoder refers to a codebook to map each received index into corresponding expanded data, and forms an expanded data set suitable for image display or further image processing. This is used, for example, in compression and expansion of two-dimensional images.

According to the invention, however, a decoder 28 receives the compressed data 10 from the communications and/or storage medium. Upon receiving a request for specific data, the decoder 28 using the array of indices 9 associating image pixels and codevectors within a codebook 26 maps some indices into a corresponding spectrum codevector at a desired spectral channel, and forms an array of spectral values suitable for image display or further image processing. Therefore, according to the invention, memory requirements are greatly reduced for display, processing, and storage of hyper-spectral data. For example, in order to extract an image from compressed data 10 stored in memory reduced memory requirements over extracting the datacube result. When spectral vectors are captured having 72 16 bit bands for 2200 lines and 128 pixels across a two-dimensional image of a cross section of the datacube has 2200×128 pixels (281,600) with a pixel depth of 16 bits, 0.56 megabytes are required to store each of the 72 single images in each band. When the codebook 26 comprises 4096 codevectors—an index value having 12 bits (stored as a 12 bit value), a further 576 kilobytes (589,824 bytes) is required to store the codebook and another 412.5 kilobytes, 422,400 bytes, for storing the array of indices 9 associating image pixels and codevectors within a codebook 26. In this example, the total memory requirements for displaying an image—all data stored in RAM—is about 1 megabyte. The original datacube has a size of 40.6 megabytes. The resulting compression ratio is 40.1 when the codebook and index map sizes are taken into account.

Since 4096 ($2^{12}$) codevectors are stored instead of 281,600 codevectors, memory requirements for navigation through, viewing of, and many forms of processing are greatly reduced. Also, processing speed is enhanced significantly. For example, in order to locate all locations within an image wherein the associated spectrum comprises a peak in a predetermined channel or group of channels requires peak identification on the codevectors within the codebook 26. According to the prior art, peak identification was required for each spectrum within the hyper-spectral data—for 281,600 spectral vectors in the above example. When 4096 codevectors form a codebook, the speed increase is approximately 70 fold. When 1024 codevectors form a codebook, the speed increase is near 275 fold. When the datacube is significantly larger, for example 1024×1024 by 72 bands, the performance increase is 256 for a codebook of 4096 codevectors and 1024 for a codebook of 1024 vectors. It is apparent to those of skill in the art that reduced computation time and memory requirements, allows implementation of a system for viewing, navigation, processing and for performing other tasks with compressed hyper-spectral data compressed according to the invention on a desktop computer as is commonly available. This significantly reduces costs associated with hyper-spectral data analysis and increases availability of such analysis to smaller organisations and researchers.

An alternative embodiment of the invention is disclosed herein, which takes further advantage of spatial correlation between adjacent spectral vectors within datacube D. Here, the process is similar to that set out above, except for additional inclusion of a correlation coding procedure in the vector matching encoder 24 as described below.

Figure 3:
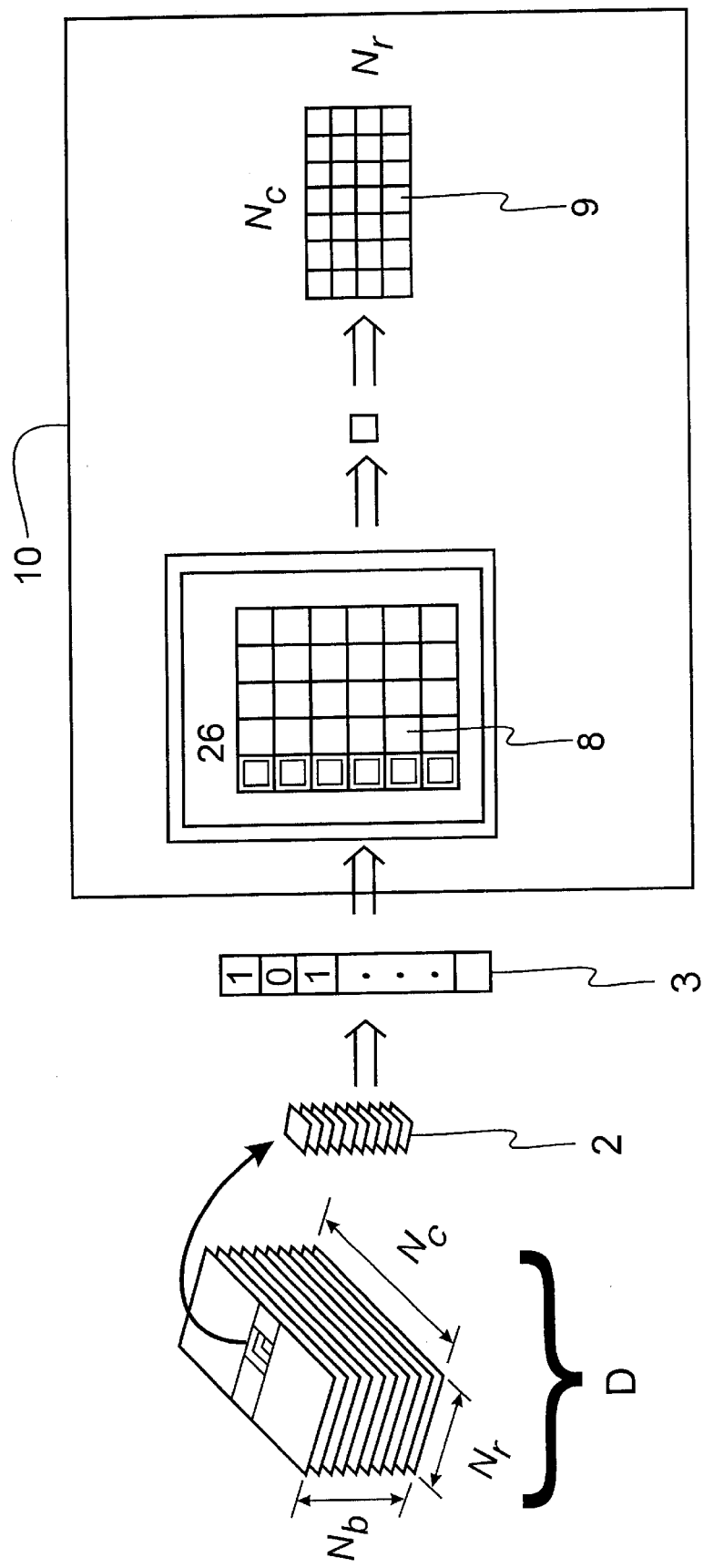
FIG. 3 illustrates a sequence of signal transformations occurring when the embodiment of FIG. 2 is in use.

Referring again to FIG. 2, in one aspect of the embodiment illustrated, a cross section of the datacube represents image data related to a two-dimensional image. There, a spectrum image vector representing a pixel (i, j) in the spatial domain is more specifically defined as $$x_{i,j}=[x_{i,j}(1), x_{i,j}(2), \ldots, x_{i,j}(N_b)]^T \ (i=1,2, \ldots, N_r\, j=1,2, \ldots, N_c), \quad (1)$$

as one element within an array 2 having a rectangular spatial domain of $N_r \times N_c$ pixels and a spectral domain of $N_b$ spectral bands per pixel. There are a total of $N_r \times N_c$ vectors in the array 2 with spatial dimensions $N_r$ rows and $N_c$ columns, and the dimension of each vector is equal to the number of spectral bands $N_b$. This is illustrated in FIG. 3, which shows a sequence of signal transformations occurring when the embodiment of FIG. 2 is used for compressing such a three-dimensional datacube D.

In a similar manner to that described above, these spectrum image vectors 2 are reduced by the spectral compressor 22 into binary image vectors 3 each formed by concatenating a set of 3 binary vectors, in a similar manner to what is explained above. The binary image vectors 3 have a length $L=3N_b-2$ bits which is typically much shorter than the spectrum image vectors 2. The spectral compressor 22 first reduces an $N_b$-band spectrum $x_{i,j}(l)(l=1,2, \ldots, N_b)$ into an $N_b$-bit amplitude binary vector $\vec{X}_{i,j}^a$, an $(N_b-2)$-bit slope binary vector $\vec{X}_{i,j}^s$ and an $N_b$-bit mean deviation binary vector $\vec{X}_{i,j}^{MD}$. The amplitude binary vector $\vec{X}_{i,j}^a$ is constructed from $$\vec{X}_{i,j}^a=[X_{i,j}^a(1), X_{i,j}^a(2), \ldots, X_{i,j}^a(N_b)]^T \ (i=1,2, \ldots, N_r\, j=1,2, \ldots, N_c) \quad (2)$$

$$X_{i,j}^a(\lambda) = \begin{cases} 1 & [x_{i,j}(\lambda) - \mu_{i,j}] \geq 0 \\ 0 & [x_{i,j}(\lambda) - \mu_{i,j}] < 0 \end{cases} \lambda = 1, 2, \ldots, N_b \quad (3)$$

where the scalar quantity $\mu_{i,j}$ is defined as the spectral mean of pixel (i,j), $$\mu_{i,j} = \frac{1}{N_b} \sum_{\lambda=1}^{N_b} x_{i,j}(\lambda) \ (i = 1, 2, \ldots, N_r\ j = 1, 2, \ldots, N_c). \quad (4)$$

It describes the variation in amplitude relative to the mean. The slope binary vector given $$\vec{X}_{i,j}^s=[X_{i,j}^s(1), X_{i,j}^s(2), \ldots, X_{i,j}^s(N_b)]^T \ (i=1,2, \ldots, N_r\, j=1,2, \ldots, N_c), \quad (5)$$

by equation 5 is constructed from $$X_{i,j}^s(\lambda) = \begin{cases} 1 & [x_{i,j}(\lambda+1) - x_{i,j}(\lambda-1)] \geq 0 \\ 0 & [x_{i,j}(\lambda+1) - x_{i,j}(\lambda-1)] < 0 \end{cases} \lambda = 2, 3, \ldots, N_b - 1. \quad (6)$$

$$\vec{X}_{i,j}^{MD}=[X_{i,j}^{MD}(1), X_{i,j}^{MD}(2), \ldots, X_{i,j}^{MD}(N_b)]^T \ (i=1,2, \ldots, N_r\, j=1,2, \ldots, N_c), \quad (9)$$

A mean deviation binary vector $\vec{X}_{i,j}^{MD}$ is then constructed from $$X_{i,j}^{MD}(\lambda) = \begin{cases} 1 & |x_{i,j}(\lambda) - \mu_{i,j}| \geq MD_{i,j} \\ 0 & |x_{i,j}(\lambda) - \mu_{i,j}| < MD_{i,j} \end{cases} \lambda = 1, 2, \ldots, N_b \quad (10)$$

where $MD_{i,j}$ is defined as spectral mean deviation of pixel (i,j), $$MD_{i,j} = \frac{1}{N_b} \sum_{\lambda=1}^{N_b} |x_{i,j}(\lambda) - \mu_{i,j}| \ (i = 1, 2, \ldots, N_r\ j = 1, 2, \ldots, N_c) \quad (11)$$

Figure 4:
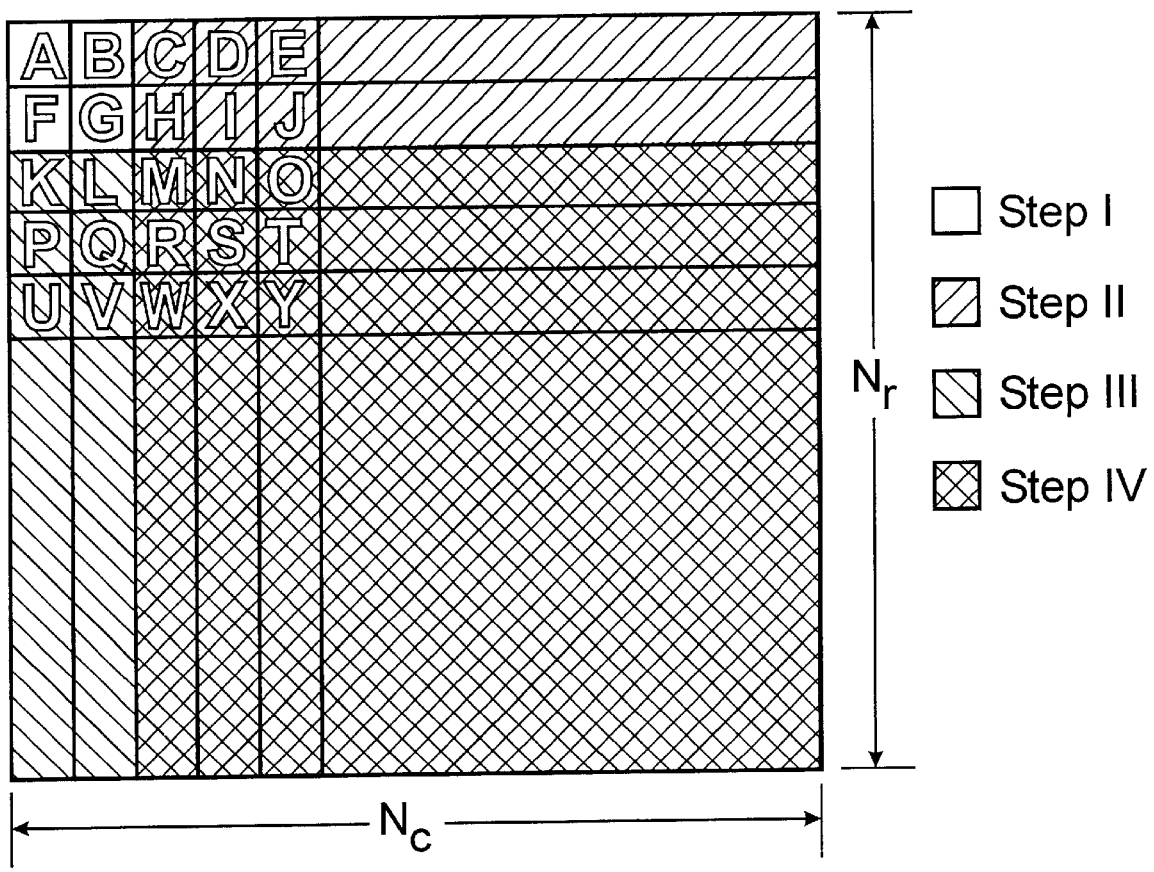
FIG. 4 is a view of a two-dimensional array of $N_r \times N_c$ indices used for encoding the array of encoded image pixels shown in FIG. 3, to illustrate the operation of the correlation algorithm in one aspect of the embodiment of FIG. 2.

These three binary vectors $\vec{X}_{i,j}^a$, $\vec{X}_{i,j}^s$ and $\vec{X}_{i,j}^{MD}$ are then concatenated to form a single $(3N_b-2)$-bit binary image vector $\vec{X}_{i,j}$ A vector matching encoder 24 in the form of a correlation encoder matches codevectors 2, 3. The encoder 24 determines an index 9 corresponding to each matched codevector 5, 8 received therein. It then forms a two-dimensional array—for a three-dimensional datacube—of $N_r \times N_c$ indices $C_p$, each said index 9 being positioned at a row co-ordinate i and a column co-ordinate j of said index array, to correspond to a spectral vector at similar i and j co-ordinates within the three-dimensional datacube D. The encoder 24 further comprises a movable two-dimensional window having 2 rows and 2 columns, for comparing the spectral vectors in adjacent positions within any 2×2 cell of indices 9 from the index array. The encoder 24 uses a correlation algorithm for moving the window in a predetermined sequence across the entire index array, allowing for reading of the indices of one cell within a window at a time, and for generating a correlation symbol for each cell within the window, each said symbol to refer no more than once to an index value within said cell, and to define a dissimilarity pattern among index values within said cell. The correlation algorithm forms such correlation symbols by performing the steps described below with reference to the structure of the index array as illustrated in FIG. 4.

Step I: Initialise the First Block

The window is positioned over an initial cell at a corner of the two-dimensional index array and the indices therein are used to generate a correlation symbol referring to values of dissimilar indices within the initial cell and defining a dissimilarity pattern among index values therein. As shown in FIG. 4, the window is located in the upper left corner, using spectral vectors at positions A, B, F and G. The spectral vectors at positions B, F and G are compared with the codevector associated with the position A. The same procedure is applied for the vectors F and G. As shown in the table below, there are 15 possible combinations of the four indices in Step I, which are encoded as 15 correlation symbols $C_1^{(1)}$ through $C_{15}^{(1)}$. With a different correlation symbol, a different number of bits is required to encode the four codevectors corresponding to the four indices in the window. Additional 4 bits are used to designate a particular one of 15 correlation symbols. In all the tables given below, N is the length of a binary codevector 5.

| Correlation Symbol | Dissimilarity pattern | Bits to encode 4 vectors in the window |
|---|---|---|
| $C_{(1)}^1$ | All 4 indices are different | $4\log_2 N + 4$ |
| $C_{(1)}^2 - C_{(1)}^7$ | 2 of the indices are identical | $3\log_2 N + 4$ |
| $C_{(1)}^8 - C_{(1)}^{11}$ | 3 of the indices are identical | $2\log_2 N + 4$ |
| $C_{(1)}^{12} - C_{(1)}^{14}$ | 2 pairs of indices are identical | $2\log_2 N + 4$ |
| $C_{(1)}^{15}$ | All 4 indices are identical | $\log_2 N + 4$ |

Alternatively, the method is applicable with reasonable modification to a datacube having more than three-dimensions.

Step II: Process the First Two Rows

As shown in FIG. 4, the window is then positioned over a new cell having a portion overlapping with the initial cell and the indices within the new cell are used to generate a correlation symbol referring to values of indices outside said portion dissimilar to indices inside said portion, and defining a dissimilarity pattern among index values inside and outside said portion. The first two rows are used but not the first column of the index array since it has been analysed previously. The window is then moved over the index array from left to right, for example over blocks BCGH, CDHI, DEIJ, etc. In block BCGH, only the indices of codevectors at position C and H are produced, because indices at positions B and G are already known from Step I. There are 10 possible relations between the two new indices and the two known indices. 10 correlation symbols are used to encode them: $C_1^{(2)}$ through $C_{10}^{(2)}$.

| Correlation Symbol | Dissimilarity pattern | Bits to encode 2 new vectors |
|---|---|---|
| $C_{(2)}^1$ | 2 new indices are different from 2 known indices | $2\log_2 N + 4$ |
| $C_{(2)}^2$ | 2 new indices are identical to each other, but different from the 2 known indices | $\log_2 N + 4$ |
| $C_{(2)}^3 - C_{(2)}^6$ | 1 new indices is identical to 1 of the 2 known index | $\log_2 N + 4$ |
| $C_{(2)}^7 - C_{(2)}^{10}$ | 2 new indices are identical to 2 known indices | 4 |

Step III: Process the First Two Columns

This step is similar to the previous step except the window is moved vertically. That is, the window is moved such that it covers the first two columns in a new row of the index array, for example, blocks FGKL, KLPQ, PQUV etc. shown in FIG. 4. Coding is performed as above excepting the known indices are oriented differently. There are also 10 possible relations between the two new indices and the two known indices. 10 correlation symbols are used: $C_1^{(3)}$ through $C_{10}^{(3)}$. The coding results are the same as listed in the table under Step II.

Step IV: Recursively Process the Remaining Cells

The window moves to progressively repeat a process of reading the indices of a new cell having a portion overlapping a portion of a previously read cell. With each window location a correlation symbol is generated referring to values of indices outside said portion dissimilar to indices inside said portion, and defining a dissimilarity pattern among index values inside and outside said portion, until the entire index array is read. Neither the first row nor the first column in the index array is used again, i.e. blocks GHLM, HIMN, LMQR, etc. as these have been analysed previously. Only one index in the window needs to be encoded during this step as the window is moved to a new location. For example, when the window is located at block GHLM, only the index at position M is encoded because the indices at positions G, H and L are known. In Step IV, the new index at position M has only 4 possible relations with the three known indices: the same as that at position G or H or L, or different from all of them. Thus, 4 correlation symbols $C_1^{(4)}$ through $C_4^{(4)}$ are used to encode them. If the new index is identical to one of the three known indices, 2 bits are sufficient to encode the new index. Only if the new index is different from all the three known indices, $\log_2 N + 2$ bits are required.

Step I occurs only once. The encoder moves the window over the index-map $N_c-2$ and $N_r-2$ times respectively in Step II and III. Step IV is the most frequent operation. The window is moved a total of $(N_r-2) \times (N_c-2)$ times to encode an image D with spatial dimensions $N_r$ rows and $N_c$ columns.

Optionally, the above disclosed correlation procedure uses a window of larger dimensions than 2×2 but smaller than that of a $N_r \times N_c$ index array.

Data Analysis, Viewing, and Decompression

According to an embodiment of the present invention, a codebook comprises a plurality of vectors along a single dimension of a data cube or higher order data structure. In an exemplary embodiment presented herein, the codevectors are representative of approximate spectral vectors and the spatial information is encoded in the index map. There are many advantages to such a data structure other than minimising data storage, as is commonly the main goal of compression. Some of these advantages and methods of achieving these advantages are set out herein below.

Often, data processing of hyper-spectral data in the form of datacubes comprises spectral processing in the form of filtering, searching, peak identification, spectral matching and so forth. According to prior art methods of compression, de-compression (often referred to as expansion) is required prior to data processing. Therefore, in order to analyse a data cube comprising 72 spectral bands and 2200 lines with 128 pixels requires a minimum data storage of 128*2200*72 information locations. When spectral imaging is performed using a 16 bit spectrometer, this results in a requirement for about 40 Mbytes of storage. To optimise processing time, that amount of RAM is required and, even with RAM prices becoming more inexpensive each day, the cost of a suitable workstation is considerable. This is more significant for even larger datacubes as described earlier.

Using a compression algorithm according to the invention, data processing is performed on the codebook directly as described above. For example, peak identification is easily performed on each spectrum within a codebook. This is performed using a smaller amount of data storage that was necessary according to the prior art. Detecting certain spectral patterns is also easily performed on the codebook. By extension, transformations of the data are often well suited to being performed directly on the codebook. Of course, when more accurate processing of data is desired, further processing may be performed in conjunction with the codebook processing step.

An example of a filtering operation is discussed below with reference to FIG. 5. The codebook shown in FIG. 5 comprises 10 spectral vectors each having 9 bands therein. Commonly, a codebook will have many hundreds if not thousands of spectral vectors in the form of codevectors. The 10 spectral vectors are very simple merely for exemplary purposes. A transform for filtering out spectral vectors that do not have values over 10 in their second through fifth bands is applied. The transform maps each codevector onto a new codevector having 10 bands. The first band is a flag indicating transform results. Optionally, the first band requires a single bit of information. The results indicate whether or not a spectrum has been filtered. Memory optimisation is not performed due to the compact size of the codebook. Alternatively, memory optimisation is performed.

Figures 5, 6:
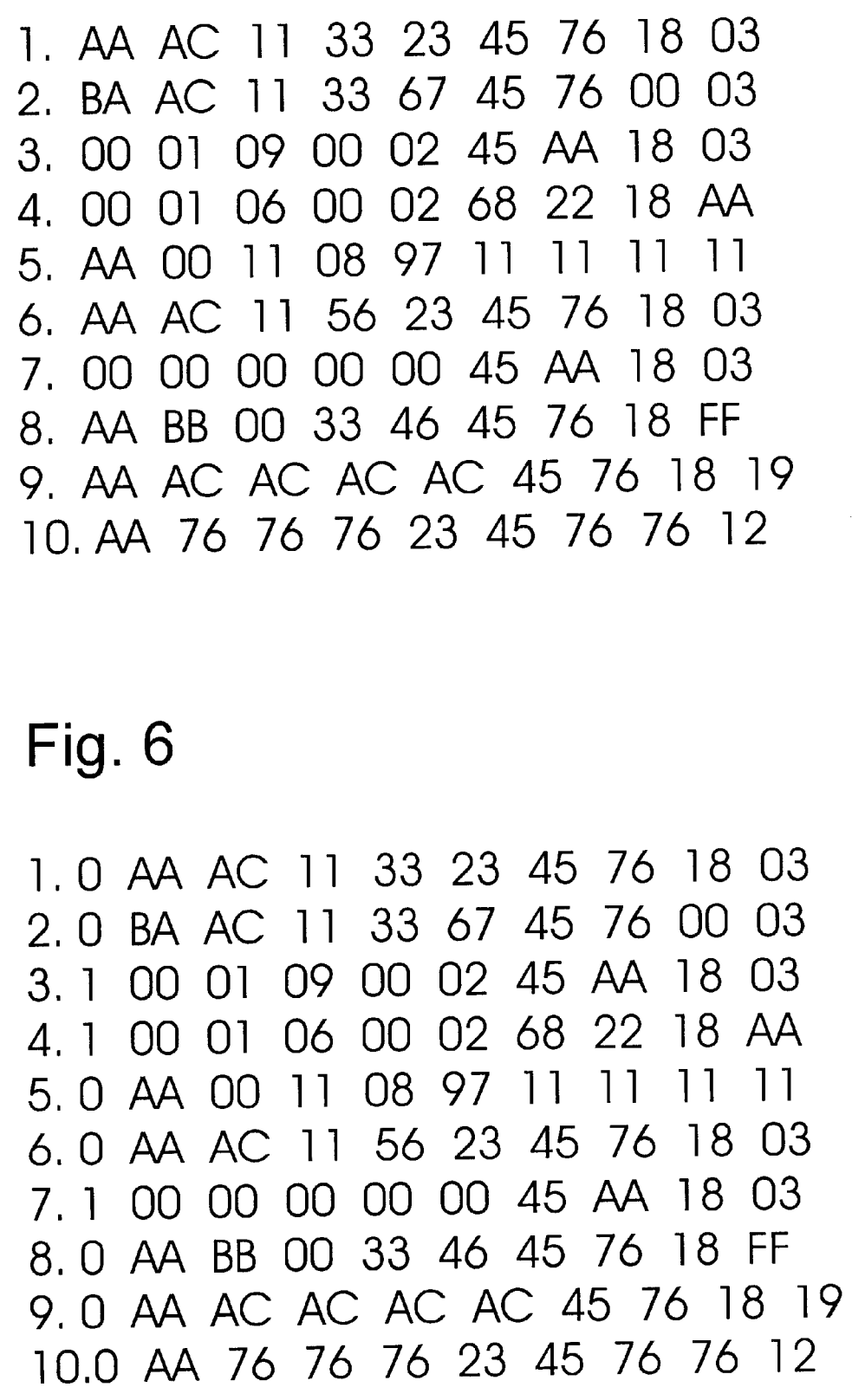

The resulting codebook is shown in FIG. 6. Only indices referring to the third, fourth and seventh spectral vectors within the codebook shown in FIG. 5 are significant in this example. All other indices reference spectral vectors that are not significant in this example. That is, the index array is searched for those indices that are significant. Again, when desired, memory optimisation of the search results is performed. Similarly, peak identification is also easily performed on spectral vectors within the codebook in a similar fashion. It is advantageous that the codebook of FIG. 6 uses a same index map as the codebook of FIG. 5. Since the index map is often much larger than the codebook, maintaining several codebooks and a single index map does not significantly increase memory requirements. Other methods of processing may result in codebooks having a smaller size, such as, a codebook merely containing the flags corresponding to a 10 bit codebook.

Of course, when a mathematical operation is performed on each spectral vector in isolation, a result can be stored in a new codebook, such as the one shown in FIG. 6. Another example of processing of hyper-spectral image data according to the invention is as follows. When performing a three-band ratio, one desires a difference between two bands divided by the sum of the bands. Essentially, for a three-band ratio a same weighting and ratio calculation is not necessary for each pair of spectral bands or channels. According to the prior art, a calculation is required for each spectral vector and, in the example above, 281,600 three-band ratios are calculated. According to the invention, a three-band ratio is calculated for each spectral vector or codevector within the codebook resulting in 4096 three-band ratio calculations. As is evident to those of skill in the art, when fewer codevectors form a codebook, the number of calculations decreases. With 256 codevectors, an improvement in performance is achieved for the calculation. Performance improvements such as these are considered significant.

According to another embodiment, the compressed data file 10 is used as a data viewing and filtering tool. Once those vectors that are potentially significant are identified, those vectors are retrieved from the original datacube D. For example, should NASA store large volumes of hyper-spectral data in the form of datacubes for distribution to the public, it would be impractical to have people downloading very large files to their computers. Using the method described herein, the people download codebooks and index arrays. They search for specific spectral vectors of interest and for those locations of interest, more accurate spectral vectors are downloaded across the Internet or another communication link. Communication links are well known in the art for both transmitting and receiving digital data. Of course, when the codebook data is sufficiently accurate, further downloading of data is not necessary.

Further alternatively, a number of codebooks are created for a single datacube. Users are able to download codebooks of different size and accuracy depending on user needs and user system capabilities. A user interested only in infra red imaging downloads only those spectral ranges comprising infrared. This is straight forward as it involves a simple transformation of codevectors within the codebook and no modification of the index array. In yet another embodiment, portions of the codebook are loaded from a server as necessary and stored within a codebook local to a workstation. When data is queried that is not yet stored locally, it is requested from the server, transmitted therefrom, received locally, and stored locally.

The method of compression according to the invention also allows for immediate viewing of data without decompression thereof. This is very significant when used on systems having minimal resources. Also, since an entire codebook and index table is not much larger than an image, a user is provided with much additional information using similar resources. Of course, some additional memory requirements exist for storing the codebook, the index map and an image derived therefrom over storing a single image.

As an example of resource requirements, when a data cube of 16 bits by 72 channels by 2200 lines by 128 pixels is compressed using 4096 codevectors resulting in a memory requirement of just over a megabyte for data storage. Since personal computers are now commonly provided with 16 megabytes of memory, analysis and display of spectral data is easily performed on a personal computer according to this invention. This is contrasted with analysis and display of the original 40 megabyte datacube.

As such, the use of a compression technique according to the invention increases flexibility in processing and displaying compressed data by obviating a need to first expand the data.

According to another embodiment of the invention, the codevectors within a codebook are each provided with statistical data indicative of a confidence in those vectors. For example, a largest error vector associated with a vector in the codebook incorporates the maximum distance between a value in the codevector and an associated value in a vector that is approximated by that codevector; an average distance vector would measure an average error for a band; and so forth. This statistical information improves the confidence with which the compressed data is manipulated and analysed. For example, this data is useful for determining a need to request further data from a server such as "real" spectral data or a codebook having higher fidelity. It also allows analysis of result reliability to see if further analysis or reanalysis of any portion of the data is required.

For example, give a datacube D, whose size is $N_c$ pixels by $N_r$ lines by $N_b$ spectral bands, it is defined as:

$$D = \{\vec{x}_p\} \quad p=1,2,\ldots,N_v \tag{12}$$

where $N_v = N_r \times N_c$ is the number of total vectors in the datacube, and $\vec{x}_p = [x_p(1), x_p(2), \ldots x_p(N_b)]$ is a spectral vector p.

A codebook C with N codevectors, which are trained from the Training Set R of size $TS_{size}$ subsampled from the datacube D, is defined as:

$$C = \{\vec{y}_q\} \quad q=1,2,\ldots,N \tag{13}$$

where $\vec{y}_q = [y_q(1), y_q(2), \ldots y_q(N_b)]$ is a codevector with index q, it is the centre of gravity of partition q. If a spectral vector $\vec{x}_p$ meets $$d(\vec{x}_p, \vec{y}_q) \leq d(\vec{x}_p, \vec{y}_l) \text{ for all } l=1,2,\ldots,N, \tag{14}$$

where $d(\vec{x}_p, \vec{y}_q)$ is the Euclidean distance between two vectors $\vec{x}_p$ and $\vec{y}_q$, then $\vec{x}_p$ belongs to partition q whose centre is $\vec{y}_q$. $M_q$ is the number of members in the partition, and it meets following condition:

$$TS_{size} = \sum_{q=1}^{N} M_q. \tag{15}$$

In the codebook training module, the following measurements, which referred to as codevector confidence measures, are produced for the training set R. These are measures of each codevector's ability to span its partition. Each provides an estimate of the accuracy of a given encoded datacube spectrum. Of course, other confidence measures are also possible in accordance with the invention.

i) RMS Spectral Spanning Error $\vec{e}_q$, equal to the root mean square spanning error of codevector $\vec{y}_q$ at each spectral band:

$$\vec{e}_q = \{e_q(k)\} \quad k=1,2,\ldots N_b q \in R, \tag{15}$$

where $$e_q(k) = \sqrt{\frac{1}{M_q} \sum_{p=1}^{M_q} [y_q(k) - x_p(k)]^2}, \tag{16}$$

where $M_q$ is the number of members in the partition, and it meets following condition:

$$TS_{size} = \sum_{q=1}^{N} M_q \quad q \in R. \tag{17}$$

ii) RMS Overall Spanning Error $e_{q\text{-}overall}$ of codevector $\vec{y}_q$:

$$e_{q\text{-}overall} = \sqrt{\frac{1}{N_b} \sum_{k=1}^{N_b} [e_q(k)]^2} \quad q \in R. \tag{18}$$

iii) Maximum Spectral Spanning Error $\vec{E}_q$: The maximum spanning error (error bound) of codevector $\vec{y}_q$ at each spectral band:

$$\vec{E}_q = \{E_q(k)\} \quad k=1,2,\ldots N_b q \in R, \tag{19}$$

where $$E_q(k) = \max_{1 \leq p \leq M_j} |y_q(k) - x_p(k)|. \tag{20}$$

In the coding module we can also compute RMS Spectral Spanning Error $\vec{e}_p$, RMS Overall Spanning Error $e_{q\text{-}overall}$ and Maximum Spectral Spanning Error $\vec{E}_q$ for the datacube D. They are the actual errors, are transmitted to decoding module in order to provide fidelity information.

i) RMS Spectral Spanning Error $\vec{e}_q$, equal to the root mean square spanning error of codevector $\vec{y}_q$ at each spectral band:

$$\vec{e}_q = \{e_q(k)\} \quad k=1,2,\ldots N_b q \in D, \tag{21}$$

where $$e_q(k) = \sqrt{\frac{1}{M_q} \sum_{p=1}^{M_q} [y_q(k) - x_p(k)]^2}. \tag{22}$$

where $M_q$ is the number of vectors compressed by the codevector $\vec{y}_q$, and it meets following condition:

$$N_v = \sum_{q=1}^{N} M_q \quad q \in D. \tag{23}$$

ii) RMS Overall Spanning Error $e_{q\text{-}overall}$ of codevector $\vec{y}_q$:

$$e_{q\text{-}overall} = \sqrt{\frac{1}{N_b}\sum_{k=1}^{N_b}[e_q(k)]^2} \quad q \in D. \tag{24}$$

iii) Maximum Spectral Spanning Error $\vec{E}_q$: The maximum spanning error (error bound) of codevector $\vec{y}_q$ at each spectral band:

$$\vec{E}_q = \{E_q(k)\}\ k=1,2,\ldots N_b\ q \in D, \tag{25}$$

where $$E_q(k) = \max_{l \le p \le M_j} |y_q(k) - x_p(k)|. \tag{26}$$

Advantageously, confidence measures allow processing and analysis of a compressed hypercube with a clear indication of likelihood of error. When a likelihood of error is too great for a particular application, a higher fidelity compressed datacube, an uncompressed datacube or a datacube compressed using lossless compression is retrieved. This alleviates concerns over error and data validity which arise because of the use of lossy compression.

The same systems and methods described above may be extended to higher dimensions. For example, it can be applied to a three-dimensional volume composed of two-dimensional image slices each element of which has associated spectral information. Of course, this is most applicable where correlations exist between data values along dimensions of the volume. One example of such an application is microscopy. In this sense, hyper-spectral data is defined within this specification and the claims which follow to mean data that is appropriately encoded according to the present method—datacubes having a high correlation between parallel vectors in at least one dimension.

Although the exemplary embodiment is described herein with reference to three-dimensional hyper-spectral data sets consisting of two spatial and one spectral dimensions, it is useful in absorption and reflection spectroscopy, in fluorometry, in energy transfer diffractomery (e.g. X-ray, electron, neutron) as as well as in microscopy, process control, and energy dispersive tomography.

Typically and as described above, three dimensions include two spatial dimensions and one spectral dimension. Of course, other dimensions such as time are also possible. In effect, the method described below is applicable to datacubes wherein there is a strong correlation between the vectors along one or more dimensions of the datacube. Further, in an embodiment where multidimensional data beyond three dimensions is compressed according to the present invention, codematrices are stored within a codebook in a manner analogous to the storage of codevectors described herein.

For example, when a datacube has four (4) dimensions one spectral, one temporal, and two spatial an analysis of the datacube may determine a strong correlation between temporal-spectral planes. Therefore, a codematrix is used in place of a codevector. For a datacube having 2200 lines 128 pixels 72 bands and 365 days, the amount of data within the four-dimensional datacube is astounding. When a correlation exists in the temporal-spectral plane, an index map of similar size to those described above is needed and a codebook 365 times as large—each codematrix is 72 by 365 data elements in size. This is a huge space savings over the uncompressed data. Of course, someone of skill in the art knows when such an extension is applicable.

In the case of fluorescence and more particularly fluorescent decay analysis, spectral data is acquired at a plurality of times each separated by a time interval. For example, spectral information is captured for a surface of a sample for each of 500 1 ms timeslots. The resulting four (4) dimensional datacube is helpful in analysing fluorescent decay signatures. The present invention is advantageous in performing the analysis. It is evident to those of skill in the art that the addition of another dimension to the datacube results in an exponential growth in the size of the original data. Compression and the ability to process the compressed data according to the invention is highly advantageous.

Of course, numerous other embodiments may be envisaged without departing from the spirit and the scope of the invention.

What is claimed is:

1. A method of processing hyper-spectral image data defining signal levels of multiple bands in a compressed form, the compressed form comprising an array of stored indices and a codebook comprising spectral vectors each comprising a plurality of spectral values each relating to one and only one predetermined spectral band of a plurality of spectral bands, the method comprising the steps of:

for each image pixel,
determining a first band from the multiple spectral bands and an index from the array of stored indices, the index indicative of a vector having values each relating to one and only one predetermined spectral band for each of the plurality of the multiple spectral bands within the codebook of spectral vectors, and
retrieving from the indicated spectral vector within the codebook of spectral vectors a value corresponding to the first band.

2. A method according to claim 1 comprising the step of displaying an image comprising image pixels, image pixel values based upon the values retrieved for each image pixel.

3. A method according to claim 1 comprising the step of storing an image comprising image pixels, image pixel values based upon the values retrieved for each image pixel.

4. A method of processing hyper-spectral image data as defined in claim 1 wherein each spectral vector comprises data from a plurality of spectral bands, each band representative of a range of wavelengths $\lambda$.

5. A method of processing hyper-spectral image data as defined in claim 1 wherein each spectral vector comprises data from a plurality of bands, each band representative of one of a time and a range of times.

6. A method of processing hyper-spectral image data as defined in claim 1 wherein the step of retrieving from the indicated vector within the codebook of spectral vectors a value is performed by retrieving one and only one value, the value corresponding to the first band and the index.

7. A method of processing hyper-spectral image data as defined in claim 1 comprising the steps of:

for each image pixel,
determining a second band from the multiple spectral bands and an index from the array of stored indices, the index indicative of a vector having values for each of the plurality of the multiple spectral bands within the codebook of spectral vectors, and
retrieving from the indicated vector within the codebook of spectral vectors a value corresponding to the second band.

8. A method of processing hyper-spectral image data as defined in claim 7 comprising the step of displaying a plurality of values corresponding to the first band and the second band, a value corresponding to the first band displayed in a first colour and a value corresponding to the second band displayed in a second other colour.

9. A method of processing hyper-spectral image data as defined in claim 8 wherein the steps of retrieving a value are performed over a public network, the values retrieved from network accessible data.

10. A method of processing hyper-spectral image data as defined in claim 1 comprising the steps of:
   providing decompressed hyper-spectral data;
   for each image pixel, retrieving from the decompressed hyper-spectral data a value corresponding to first band; and,
   displaying the values corresponding to the first band and retrieved from the codebook of spectral vectors in a first colour and displaying the values corresponding to the first band and retrieved from the decompressed hyper-spectral data in a second other colour.

11. A method of processing hyper-spectral image data defining signal levels of multiple spectral bands per image pixel in a compressed form, the compressed form comprising an array of stored indices and a codebook of spectral vectors, the method comprising the step of:
   processing spectral vectors having values for each of a plurality of the multiple spectral bands within the codebook of spectral vectors to produce a processed codebook, each spectral vector processed in isolation.

12. A method of processing hyper-spectral image data as defined in claim 11 wherein during the step of processing spectral vectors one or more spectral bands within each spectral vector within the codebook of spectral vectors is processed.

13. A method of processing hyper-spectral image data as defined in claim 11 wherein during the step of processing spectral vectors, the spectral vectors are sub-sampled to provide second spectral vectors having less data than the spectral vectors.

14. A method of processing hyper-spectral image data as defined in claim 11 wherein the step of processing comprises at least one of highlighting, selecting, mathematically filtering, mathematically altering and performing unsupervised classification.

15. A method of processing hyper-spectral image data as defined in claim 11 wherein the step of processing comprises applying logical rules to the hyper-spectral image data.

16. A method of processing hyper-spectral image data as defined in claim 12 comprising the steps of:
   for each image pixel, determining a band from the multiple spectral bands and an index from the array of stored indices, the index indicative of a vector within the processed codebook and retrieving from the indicated vector within the processed codebook a single value corresponding to the determined band; and,
   displaying an image comprising pixels, pixel values corresponding with the values retrieved for each pixel.

17. A method of processing hyper-spectral image data as defined in claim 16 wherein the step of processing comprises reducing the information content of each spectral vector within the codebook of spectral vectors, the method comprising the steps of:
   transmitting the processed codebook via a communication medium from a first computer to a second other computer;
   receiving the processed codebook at the second other computer,
   wherein the step of displaying is performed at the second other computer.

18. A method of processing hyper-spectral image data as defined in claim 11 wherein the step of processing includes the steps of:
   providing searching criteria, each of which is determinable within a single same spectral band; and,
   searching by applying the searching criteria to each vector within the codebook of spectral vectors to determine spectral vectors, portions of which meet the search criteria, and to store data relating to the determined spectral vectors.

19. A method of processing hyper-spectral image data as defined in claim 18 wherein the data relating to the determined spectral vectors includes an indication of the determined spectral vectors.

20. A method of processing hyper-spectral image data as defined in claim 18 wherein the data relating to the determined spectral vectors comprises transformed spectral vectors.

21. A method of processing hyper-spectral image data as defined in claim 18 wherein the step of processing comprises reducing the information content of each spectral vector within the codebook of spectral vectors, the method comprising the steps of:
   transmitting the processed codebook via a communication medium from a first computer to a second other computer;
   receiving the processed codebook at the second other computer.

22. A method of processing hyper-spectral image data as defined in claim 21 comprising the steps of:
   for each pixel, determining a band from the multiple spectral bands and an index from the array of stored indices, the index indicative of a spectral vector having values for each of a plurality of the multiple spectral bands within the codebook of spectral vectors and retrieving from the indicated spectral vector within the codebook of spectral vectors a value corresponding to the determined band;
   retrieving the stored indication; and,
   displaying on the second other computer an image comprising image pixels, image pixel values based on the values retrieved for each image pixel and the retrieved indications.

23. A method of processing hyper-spectral image data as defined in claim 22 wherein the displayed image includes highlighted pixels, highlighting determined based on the stored indications.

24. A method of processing hyper-spectral image data as defined in claim 11 comprising the steps of:
   transmitting the codebook of spectral vectors and the array of stored indices from a first computer to a second other computer, the second other computer remote from the first computer,
   wherein the step of processing is performed on the second other computer and includes determining from the codebook of spectral vectors and the array of stored indices, data within the hyper-spectral data that is significant for further analysis;
   requesting the data from the first computer;
   compressing decompressed hyper-spectral data associated with the requested data according to a known compression algorithm to produce compressed data; and,
   transmitting the compressed data to the second computer.

25. A method of processing hyper-spectral image data as defined in claim 24 wherein the compressed data has a higher fidelity than the codebook of spectral vectors and the array of stored indices.

26. A method of processing hyper-spectral image data as defined in claim 25 wherein the step of compressing consists of performing lossless compression.

27. A method of processing hyper-spectral image data as defined in claim 11 comprising the step of retrieving information indicative of spectral vector significance, the spectral vector significance determined using significance analysis.

28. A method of processing hyper-spectral image data as defined in claim 27 wherein the information is retrieved from within at least one of the codebook of spectral vectors and the stored indices.

29. A method of processing hyper-spectral image data as defined in claim 28 wherein the information includes at least one of mean, average, and standard deviation.

30. A method of processing hyper-spectral image data as defined in claim 28 wherein the information includes an ordering of the hyper-spectral image data.

31. A method of processing hyper-spectral image data as defined in claim 28 wherein the information includes at least one of a histogram, a running average, principle component analysis, unsupervised classification, spectral mixing, and filtering.

32. A method of processing hyper-spectral image data defining signal levels of multiple spectral bands per image pixel in a compressed form, the compressed form comprising an array of stored indices and a codebook of spectral vectors, the method comprising the step of:

processing spectral vectors having values each relating to one and only one predetermined spectral band for each of a plurality of the multiple spectral bands within the codebook of spectral vectors and data from the index map to extract information from the codebook of spectral vectors and index map other than pixel values for display absent a step of extracting a decompressed datacube from the codebook of spectral vectors and index map.

33. A method of processing hyper-spectral image data as defined in claim 32 wherein the information is indicative of spectral vector significance, the spectral vector significance determined using significance analysis.

34. A method of processing hyper-spectral image data as defined in claim 33 wherein significance is determined by searching for predetermined statistical information within the codebook of spectral vectors and stored indices.

35. A method of processing hyper-spectral image data as defined in claim 34 wherein the statistical information includes at least one of mean, average, and standard deviation.

36. A method of processing hyper-spectral image data as defined in claim 34 wherein the statistical information includes an ordering of the hyper-spectral image data.

37. A method of processing hyper-spectral image data as defined in claim 34 wherein the statistical information includes at least one of a histogram, a running average, principle component analysis, unsupervised classification, spectral mixing, and filtering.

38. A method of processing hyper-spectral image data as defined in claim 32 wherein the information is another index map.

39. A system for processing hyper-spectral image data defining signal levels of multiple spectral bands in a compressed form, the compressed form comprising an array of stored indices and a codebook comprising spectral vectors each comprising a plurality of spectral vectors, the system comprising:

means for selecting for each image pixel a first band from the multiple spectral bands and an index from the array of stored indices, the index indicative of a spectral vector having values each relating to one and only one predetermined spectral band for each of the plurality of the multiple spectral bands within the codebook of spectral vectors, and means for retrieving for each image pixel from the indicated vector within the codebook of spectral vectors a value corresponding to the first band; and, means for displaying an image comprising image pixels, image pixel values based upon the values retrieved for each image pixel.

40. A system as defined in claim 39 wherein the means for retrieving a value includes communication means for communicating via a public network.

41. A system as defined in claim 39 wherein the means for displaying an image includes means for displaying a plurality of values corresponding to the first band in a first colour and other values in a second other colour.

42. A method of processing hyper-spectral image data defining signal levels of multiple spectral bands in a compressed form, the compressed form comprising an array of stored indices and a codebook comprising spectral vectors each comprising a plurality of spectral vectors, the method comprising the steps of:

for each image pixel,
determining a first band from the multiple spectral bands and an index from the array of stored indices, the index indicative of a spectral vector having values for each of the plurality of the multiple spectral bands within the codebook of spectral vectors, and retrieving from the indicated vector having values for each of the plurality of the multiple spectral bands within the codebook of spectral vectors a value corresponding to the first band; and, displaying an image comprising image pixels, image pixel values based upon the values retrieved for each image pixel.

43. A method of processing hyper-spectral image data defining signal levels of multiple bands in a compressed form, the compressed form comprising an array of stored indices and a codebook comprising a plurality of vectors, the method comprising the steps of:

for each image pixel,
determining a first band from the multiple spectral bands and an index from the array of indices, the index indicative of a vector having values each relating to one and only one predetermined spectral band for each of the plurality of the multiple spectral bands within the codebook, and retrieving from the indicated vector within the codebook of spectral vectors a value corresponding to the first band.

44. A method of processing hyper-spectral image data as defined in claim 16 wherein the step of processing comprises the steps of modifying the information content of the codebook of spectral vectors, the method comprising the steps of:

retrieving the codebook from a computer;

processing the codebook at a computer, wherein the step of displaying is performed at a same computer as the computer on which the data is processed.

* * * * *